United States Patent [19]

Swartley

[11] Patent Number: 4,622,231

[45] Date of Patent: * Nov. 11, 1986

[54] CONVECTION FOOD HEATING

[75] Inventor: John S. Swartley, Westport, Conn.

[73] Assignee: Idea Network Company, Inc., Westport, Conn.

[*] Notice: The portion of the term of this patent subsequent to Mar. 27, 2001 has been disclaimed.

[21] Appl. No.: 783,550

[22] Filed: Oct. 3, 1985

Related U.S. Application Data

[63] Continuation of Ser. No. 585,308, Mar. 1, 1984, Pat. No. 4,581,989, which is a continuation-in-part of Ser. No. 356,229, Mar. 8, 1982, Pat. No. 4,439,459.

[51] Int. Cl.⁴ .......................... A23L 1/00; A47J 37/00
[52] U.S. Cl. .................................... 426/438; 426/474; 426/523
[58] Field of Search .............. 426/438, 439, 509, 523, 426/519, 474; 99/346, 348, 474, 447, 401, 403, 352, 330; 126/21 A, 373 R; 219/400; 366/155, 314

[56] References Cited

U.S. PATENT DOCUMENTS 4,059,919 11/1977 Green ................................. 426/509
4,374,318 2/1983 Gilliom ................................. 99/447
4,439,459 3/1984 Swartley ............................. 426/438

Primary Examiner—George Yeung
Attorney, Agent, or Firm—Thaddius J. Carvis

[57] ABSTRACT

Disclosed are an improved method and apparatus for heating which enables rapid heating of foods to obtain any one of a number of textures. A fried taste, texture and appearance can be achieved without using large amounts of oil or encountering the other disadvantages of frying.

According to a preferred embodiment, the form of the apparatus is employed to fry foods using a heat exchange fluid comprising air containing dispersed cooking oil or fat, which performs the disclosed method. A cooking chamber is provided having a reservoir at a low point capable of holding cooking oil. The oil is dispersed into the closed heating chamber as a convective air flow is established within the heating chamber. A rotating support holds the food about an axis accentrically positioned from the axis of an impeller means which disperses the oil or fat and creates a positive flow of air within the chamber, to uniformly contact and fry the food.

6 Claims, 6 Drawing Figures

CONVECTION FOOD HEATING

RELATED APPLICATIONS

This application is a continuation of my copending application, U.S. Ser. No. 585,308, filed Mar. 1, 1984, now U.S. Pat. No. 4,581,989, which in turn is a continuation-in-part of my copending application, U.S. Ser. No. 356,229, filed Mar. 8, 1982, now U.S. Pat. No. 4,439,459.

TECHNICAL FIELD

The present invention relates to heating, and in particular to a heating process and apparatus which is particularly adaptable to rapid cooking of food to achieve results similar to those obtained by frying in hot oil, and is further adaptable to stir frying, steaming, convection cooking, slow cooking, and air drying.

Heating devices currently available are in general restricted to heating in a single mode such as by convection, radiant heat, steam, conduction by a liqid heat transfer medium and microwave energy. Each of these methods has its own advantages and characteristic effects when employed to heat food. It would, however, be advantageous to provide a single apparatus capable of use for frying a number of other cooking processes.

Among the various types of cooked foods, fried foods are especially interesting. They are widely enjoyed. They possess a taste, texture and aroma which cannot be captured by any other heating method due to both the speed of cooking and the flavors developed by the interaction of hot oil with the food surfaces. Unfortunately, there are a number of problems with the use of frying and fried foods which greatly limit the use of this method. Not the least among these is a general dislike of the frying process itself. Other problems relate to the typical mess and cost associated with frying and the potential health problems often associated with fried foods.

The dislike of frying, both deep fat frying and pan frying, is believed to deter large numbers of domestic, non-professional cooks from frequently preparing food by these methods. This stems in part from the dangerous and often painful spattering of hot cooking oil and the potential danger involved in utilizing relatively large volumes of cooking oil at temperatures typically within the range of from about 300° to about 400° F., especially when there are children in the household. A further danger involved with frying is the tendency for the oil to ignite when improperly handled. This dislike is becoming more prominent as amateur cooks find less time to develop their skills at frying—in part because there is an increasing proportion of meals being eaten away from home and in part because of the ever increasing number of convenience food products which are being made available. Thus, the advent of alternatives to home frying, including pre-fried frozen food products and a variety of coating mixes which, to some degree, simulate the characteristics of fried foods, have decreased the frequency of home frying.

Other oil-related problems also affecting the frequent use of frying to prepare foods at home involve the mess, cost and suspected health disadvantages of frying. Typically, frying in an open pan or in a deep fat fryer will result in a film of oil on surrounding surfaces including the stove top, counter tops, walls and floor. In addition to the safety problems associated with this, it is simply often more work to clean up after preparing fried foods than is justified by the enjoyment experienced in consuming them. Moreover, in the case of deep fat frying, large amounts of relatively expensive fat or oil are required. And, the quantity of food prepared at one time is restricted by the size of the fryer. After frying is completed, time must be permitted for the oil to cool, and suitable precautions must be taken to protect the oil against becoming rancid during storage. Additionally, the resulting food product prepared in this manner typically contains a high level of fat which most people take the time to drain prior to serving for taste as well as suspected health reasons.

While fried foods have not been established as a cause for health problems among the general public when consumed in moderation as part of a balanced diet, various writers have criticized fried foods because they contain high levels of fat and because that fat is typically high in cholesterol and saturated fatty acids. Moreover, fat has a high caloric density and is known as something to be greatly restricted by weight-conscious consumers. The use of coking fat with a high content of saturated fatty acid is typical because these fats tend to have higher smoke points than polyunsaturated oils. And, when employed for deep fat frying where economics demand the reuse of the oil over several cycles of cooking, cooling and storing, the fats containing high levels of saturated fatty acids are also more stable against oxidation and can be reused over a greater period of time without becoming rancid.

Prominent among other cooking methods is convection heating which, as conventionally performed, has the disadvantage that it relies upon a poor heat conductor—air. Moreover, convection heating has a drying tendency which necessitates basting for the preparation of many food products. While basting can prevent excessive drying, it demands the constant attention of the cook throughout the period of preparation. Directly related to the poor heat transfer ability of the air is the extended cooking period which is typically required compared to frying.

An early attempt to solve the problems of prolonged cooking times and drying of the food product entailed cooking the food in a closed chamber which maintained an elevated pressure and temprature due to steam being retained within the chamber. While this method is faster than convection cooking and does prevent dryness, it cannot be employed for products which require a crispy texture or a browned exterior. For example, products such as french fried potatos and fried chicken which are typically prepared by deep fat frying, cannot be prepared by steam pressure cooking unless they are immersed in hot cooking oil within the pressure chamber. In the absence of the oil, the products are soggy and unbrowned in appearance and taste and coating materials tend to slough off. Thus, steam-convection cooking is also unacceptable for many foods.

Microwave cooking has recently become very popular because of its speed and low energy requirements; however, like steam cooking, it is not capable of providing a browned surface. Moreover, because it, in effect, cooks from the inside, steam is generated within the product and often causes surface disruptions or even a mildly-explosive shattering of the food. Recently, special microwave ovens have been designed to provide radiant heating in addition to microwave heating to provide a browned exterior on the cooked food. However, the addition of the browning element does not alleviate the problem of internal steam generation which develops a typical "steam cooked" flavor. Additionally, it is difficult to achieve uniform heating with microwave ovens. One difficulty has been the distribution of the microwave energy within the oven, but this has been solved to some degree by better design. Another difficulty, which has not yet been corrected, is that foods which have varying textures or thicknesses will often be cooked to varying degrees due to the varying absorption of the microwave energy. This in many instances necessitates employing large amounts of liquid within the cooking vessel within the oven and therefore again diminishes the ability to obtain a browned exterior on the cooked product.

Radiant heating has been in wide-spread use for a great number of years for cooking meat and other products which require a browned exterior. This process, however, has the disadvantage that temperature control at the surface of the food is difficult because the surface will absorb heat more rapidly than it can be dissipated to the surroundings or transferred to the interior of the product. Accordingly, while cooking by radiant heat, such as by broiling, is an effective method for preparing particular types of food products such as steaks, it is not practical in terms of energy consumption and process control for a wide variety of other products. Nor does it provide the hot oil contact required to develop a characteristic fried flavor.

Accordingly, there is a present need for an improved method and apparatus for heating food products which provides rapid cooking, efficiency of operation in terms of energy consumption and cooking fluids such as fats and sauces, adaptability to a wide variety of food materials and portion sizes, and the capability of providing browned, crisp, fried-like surface textures for meat products yet being capable of cooking vegetables and fruits without adversely affecting their desirable surface textures. There is a need for a cooking apparatus which has the capability of frying, stir frying, steaming, convection heating, slow cooking and air drying.

In a more limited sense, there is need for an improved process and appartus for heating food to give the taste, texture, and aroma typically afforded by frying, without the disadvantages normally associated with frying. In particular, it would be advantageous to provide an improved process and apparatus capable of preparing a fried food which would employ only very limited amounts of fat, would avoid much of the mess and danger associated with frying, and would provide fried products which would be perceived as more healthful in that they would have lower residual fat contents and could be prepared with the use of highly polyunsaturated cooking oils.

It would be further advantageous to have a process and an apparatus capable of achieving these results which could also be adaptable to the use of liquid heat transfer media other than triglyceride fats, such as water and sauces, and would be capable of control in terms of heat intensity to provide a wide variety of tastes and textures in the completed food products.

BACKGROUND ART

A number of prior art references have discussed the possibility of frying food products on a commercial scale using limited quantities of cooking oil. Basically, these disclosures can be classified into two broad groups. In the first group are those procedures which simulate frying by coating a food product with cooking oil prior to subjecting it to a separate convection heating step. In the second group are those patents which direct a pressurized spray of the oil directly against the food product.

Representative of the first group of prior art teachings is U.S. Pat. No. 4,269,861 to Caridis et al. According to this disclosure, french fried potatos are prepared for freezing and subsequent finish frying to closely resemble french fried potatos prepared directly from fresh potatos. The process includes the steps of peeling and trimming potatos, cutting them into strips, washing the strips, treating the washed strips with hot oil for a brief period, subjecting the strips to convection drying, again treating them with oil, and finally convection drying them to the desired final moisture content and a fat content of from about 3 to 7%. It is disclosed that in certain instances it may be desirable to omit immersing the strips in hot oil and that a substituted hot oil treatment can be employed. Specifically, it is disclosed that the strips may be passed through a curtain or spray of hot oil to achieve the desired oil pick-up on the potato product before subjecting the product to the hot atmosphere. Thus, while deep fat frying can be simulated by this process, it requires two distinct process steps: contact with hot oil in one step and contact with heated convection gases in another.

While this process does, to some extent, limit the quantity of oil picked up on the intermediate product, it is not disclosed as a process for preparing a completely cooked product. Moreover, the cooking steps set forth in the examples are disclosed to take about 9 minutes, to be followed by a subsequent deep fat frying step which takes another 2.5 minutes. Thus, much of the advantage of reduced oil pick-up which may be achieved during the preliminary processing would be lost where deep fat frying is necessitated for final preparation.

Representative of the second group of prior art teachings are British Pat. No. 621,821 to Crittall Kitchen Equipment Company, Ltd., et al, U.S. Pat. No. 4,134,998 to Liebermann, and U.S. Pat. No. 4,064,796 to Jones. According to the British patent, food articles are cooked by directing a pressurized spray of heated liquid cooking medium onto food articles that are supported in a cooking chamber, rather than by immersing them therein. While this procedure does somewhat decrease the amount of oil or other liquid heating medium which would be required for typical frying by immersion, a continuous spray would require substantial amounts of oil, and the pressurized spray of liquid which directly impinges upon the exterior surfaces of the food product would tend to dislodge delicate coatings of the type typically employed for chicken and the like. In addition, the continued impingement of the hot oil can cause a continuing disruption of the surface of the food, permitting the exudation of juices from the interior of the food. Moreover, the resulting product would be as saturated with fat as conventionally deep fat fried foods and would also necessitate the use of fats having high levels of saturated fatty acids to inhibit deterioration of the oil due to oxidation and exceeding its smoke point. Moreover, because all heat is supplied to the process by means of the hot oil, the ability for the oil to heat the food product is rapidly dissipated upon contact with the food and further heating is achieved only upon contacting the food with additional hot oil. Another disadvantage of the process is that the heating chamber is not sealed and steam generated during the heating process cannot be utilized to improve heating efficiency.

The disclosure of Liebermann is similar to that in the British patent in several regards, but differs principally in that the oil sprays operate at a more highly elevated pressure, disclosed as being between 10 and 70 psig. This higher pressure would have the disadvantage that it would even more readily tend to dislodge coatings and continue to disrupt the surface permitting exudation of food juices than would be expected according to the British patent disclosure. It is similar to that prior disclosure, however, with regard to the other disadvantages.

The disclosure of Jones is again similar to Liebermann and the British patent, but employs sprays from both the top and bottom of the food under conditions which provide a tranquil environment.

The use of convection heating is achieving a degree of acceptance for a number of cooking needs. According to the disclosure of U.S. Pat. No. 4,155,294 to Langhammer, cooking is achieved by directing a flow of hot air at food products held within a rotatable cage. However, because the cooking process is "greaselss", the cooking achieved cannot provide a true fried texture and flavor. Further examples of convection cookers are U.S. Pat. Nos. 4,011,805 to Vegh et al and 4,058,635 to Durth, both of which inject steam during convection heating. The food products cooked by these devices are even further removed than those of Langhammer from fried foods in terms of flavor and texture due to the steam cooking effects of the devices.

Accordingly, while the prior art has recognized that the amount of oil employed for a commercial frying process can be somewhat limited by impinging sprays of oil upon a food product, and that forced convection cooking is faster than oven baking, especially where steam is employed, there is no disclosure of a process or an apparatus which is capable of home use to achieve rapid hot oil heating of food products without the inefficiency, mess, cost, and dangers typically associated with frying foods. And, there remains a need for such a process and apparatus, especially one which could so improve efficiency, economy and simplicity of operation that consumers would not have to forgo the enjoyment of fried foods because of the limitations inherent in current home cooking methods. Moreover, it would be desirable to provide an improved cooking method and apparatus which could provide food products having the taste, texture and aroma of deep fat fried foods but use only a fraction of the normal amount of oil. This would be more attractive from a health standpoint due to lower amounts of residual fat within the cooked product and the ability to substitute highly polyunsaturated vegetable oils for the highly saturated fats which are currently required for practical and economic reasons.

DISCLOSURE OF INVENTION

In accordance with the present invention, I provide an improved process and apparatus for heating food. Heat is transferred from a heat source to a food product by circulating a heat exchange fluid. Where a fried texture is desired, the heat exchange fluid will comprise an oil dispersed in air. Other heat exchange fluids can be employed to achieve different cooking effects.

In its broad aspects, the process comprises: placing food on a support rotatable about a first axis within a heating chamber, projecting a heat exchange fluid into contact with the food within the chamber such that said fluid contacts said food accentrically of said first axis, and rotating said support about said first axis. While any heat exchange fluid can be employed, preferably it comprises one which is capable of remaining liquid under the conditions of operation. A triglyceride fat is dispersed in air, the dispersion comprising the heat exchange fluid, in the more preferred aspects of the invention, and provides a product which has the taste, texture, and aroma attributes of deep fat fried foods.

The apparatus, in one of its broad aspects comprises: a support means for holding material to be heated, means for creating a flow of hot air in proximity to the support means, and means for introducing a dispersed heat exchange medium into the air within the chamber. According to another aspect of the apparatus, a support means for holding material to be heated is rotatably mounted in a heating chamber about a first axis, and an impeller means for directing heat exchange medium into contact with the material to be heated is rotatably mounted about a second axis within the chamber.

Thus, the invention provides fundamentally new concepts of heating. The ability to achieve a fried texture according to the invention has, as a central feature, the introduction of oil into a convective air flow to improve heat transfer and increase the speed of cooking while providing intimate oil contact with the food for optimum flavor development. As will be apparent from the description of the various embodiments of the invention which will follow, the convection within the heating chamber can be created in any manner effective to provide a relative movement between the air and the food maintained within the chamber. This can be achieved by forcing a flow of air past a statinary support means holding the food, by rotating the support means holding the food within a chamber having no otherwise forced convection, or by a combination of forcing a flow of air past the support means and simultaneously rotating the support means.

The more preferred aspects of the invention provide separate, accentrically positioned axes for rotating the food support and the impeller means for directing air-dispersed-oil or other heat exchange fluid into contact with the food. The accentric flow thus achieved provides more even contact with the food. It minimizes dead spaces and hot spots, providing a better-quality product. Moreover, the ability to separately power both the support and the impeller means enables many variations in the cooking process. For example, the use of high velocity air containing dispersed fat, permits velocities sufficiently high to actually stir foods such as cut vegetables and the like during cooking. The product is stir fried by this technique. Also, it is possible to fill the chamber with an aqueous sauce or gravy and slow cook a food by slow rotation of the impeller means.

And as will become apparent, the ability to rotate the support means within the chamber at high speeds provides a desirable manner for rapidly and easily removing excess cooking oil or other liquid heat exchange medium from the cooked food product. An additional feature of the invention is that the heating chamber can be sealed, if desired, to provide the advantages of more rapid pressure cooking in combination with the convective heating which is enhanced through the introduction of dispersed hot heat exchange medium therein.

It will also become apparent that the advantages of deep fat frying and pan frying can be achieved without the danger, mess, expense and health problems normally associated with these kinds of cooking. In particular, the invention permits the use of very small amounts of cooking oil or other heat exchange medium in place of the large amounts of fat which are typically employed. Additionally, because the heating chamber can be closed, no spattering or splashing of the heat exchange medium outside of the chamber can occur. Moreover, when designed according to the more preferred aspects of the invention, the clean-up of the apparatus after cooking is simply accomplished by immersing a limited number of removable parts into hot, soapy water. And, the resulting food products are rapidly cooked almost as fast as deep fat frying due to the combination of heating effects. The food products are perceived as being more healthful because of the ability of the invention in its more preferred aspects to remove excess oil and to employ highly polyunsaturated vegetable oils as the liquid heat exchange medium.

In addition to all of these advantages, the apparatus is yet further attractive from the standpoint of practicality because it can be simply controlled for cooking a wide variety of foods, including meat, vegetables and fruits, and is adaptable to different specific types of cooking such as stir frying, convection cooking, steaming and the use of sauces or other basting liquids instead of oil.

BRIEF DESCRIPTION OF THE DRAWING

The present invention will be better understood and the above advantages and other will become more apparent when the following detailed description is read in light of the accompanying drawings wherein:

FIG. 5 is a cross-sectional view of the apparatus shown in FIG. 4; and

DETAILED DESCRIPTION OF THE INVENTION

Figure 1:
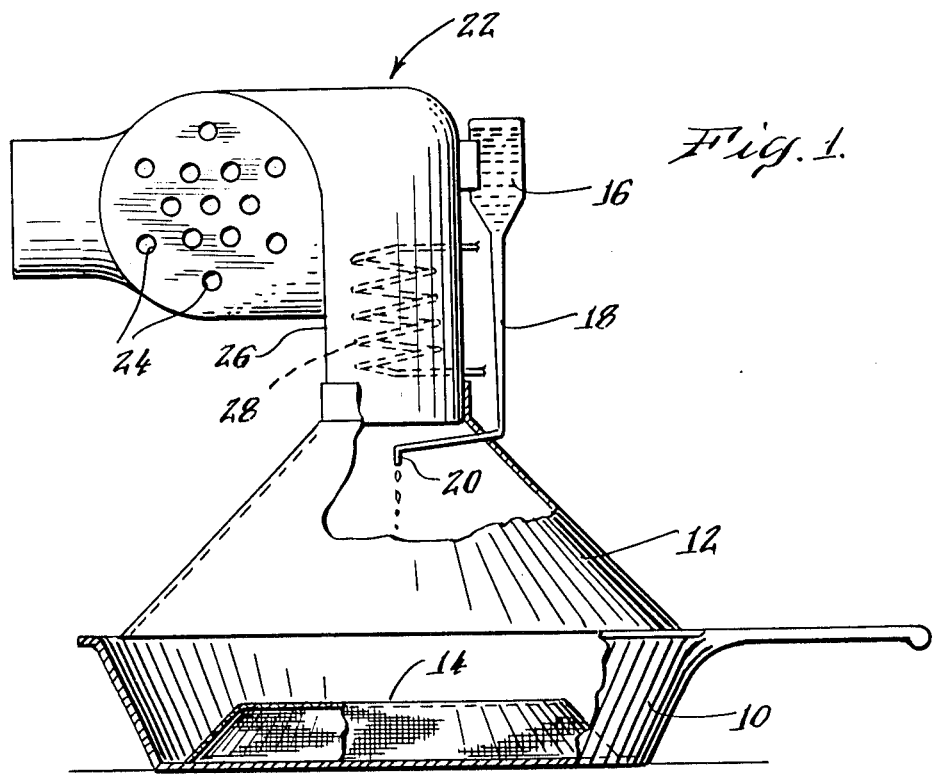
FIG. 1 schematically illustrates, partly in section, a simplified apparatus according to the present invention.

FIG. 1 illustrates one of the simplest forms of apparatus according to the invention. This figure, partly in section, shows a frying pan 10 forming the lower portion of a heating chamber, the upper portion being formed by conical partial over 12. A foraminous support 14 is positioned at the bottom of the pan 10 for holding articles, such as potatos, chicken, or the like, for heating. The support 14 is preferably made of a stainless steel wire mesh, but can be of any other suitable construction so long as it permits air to flow through from top to bottom. The partial cover 12 can be constructed to stand at the bottom of pan 10 or to be otherwise supported such as by arms which extend radially from the bottom of the cover 12 for resting upon the top of the pan 10. Where desired, the pan 10 can be placed upon a heated surface or, more typically, it is placed upon an unheated surface.

Reservoir 16 maintains a suitable supply of liquid heat exchange medium such as a triglyceride cooking oil for delivery to the heating chamber by means of delivery pipe 18 and nozzle 20. The nozzle 20 is preferably configured to provide a fine dispersion of liquid heat exchange medium within the heating chamber, but can be arranged to simply drip the liquid medium into the chamber for fine dispersion by a rapidly moving flow of hot air.

The flow of air for the embodiment of FIG. 1 is created by a hot air generator shown generally as 22. Air inlet ports 24 permit room air to be drawn into a blower maintained within the generator 22 and to be forced through channel 26 toward the support 14. An electrical resistance heater 28 is positioned within channel 26 to heat the air as it is blown therethrough. The air heats the liquid medium being dispersed by nozzle 20 and carries it into contact with the articles maintained on support 14 for heating.

The liquid heat exchange medium can be any material which is liquid under the conditions of use. Typically, the medium will be a triglyceride fat of either vegetable or animal origin or blends thereof. Where desired, the triglyceride fat can be a normally-solid fat such as lard, margarine or butter which is liqufied prior to placing into supply chamber 16. Preferably, however, the triglyceride fat will be a liquid vegetable oil, and most preferably one which is high in polyunsaturated fatty acids, such as sunflower oil, corn oil or safflower oil. It is an advantage of the present invention that these highly polyunsaturated oils can be employed with good results. In some cases, a foam reducing additive may be helpful.

The temperature of the hot air supplied by means 22 is preferably controlled, by means not shown, to be within the temperature range of from about 250° to about 450° F. which will provide rapid heating without degradation of either the articles to be heated or the oil employed. It is an advantage of the invention that tempeatures well above the smoke point of the triglyceride oil can be employed without adverse flavors being developed, because the oil remains at the elevated temperatures only for limited periods of time and is rapidly cooled upon contact with the articles being heated.

An apparatus similar to that shown in FIG. 1 was employed in a laboratory cooking test. According to this test, a regular frying pan formed the base of the system. Food was placed on a wire mesh stand within the frying pan. A typical laboratory heat gun similar to that shown in the drawing was mounted above the frying pan. Between the pan and heat gun, a partial frying pan cover was used to direct the air flow. An oil supply system including an oil reservoir and a narrow tube dripped oil into the air stream from the heat gun. The rapidly moving hot air turned the droplets of oil into a fine mist which was delivered directly onto the food by the stream of hot air. The air flowed past the food through the mesh stand and out through the openings between the pan and the partial cover into the ambient air. Some of the oil collected on the food and then dripped into the bottom of the pan. This operation cooked chicken very rapidly and delivered a typical fried appearance employing a very limited amount of oil. While this example illustrates the effectiveness of the present invention, it is not the preferred mode of operation because much of the energy supplied to heat the air is lost as the air is exhausted into the room. Additionally, this embodiment does not eliminate the problems of oil mess normally associated with frying foods, because a portion of the oil exits the pan with the air.

Figure 2:
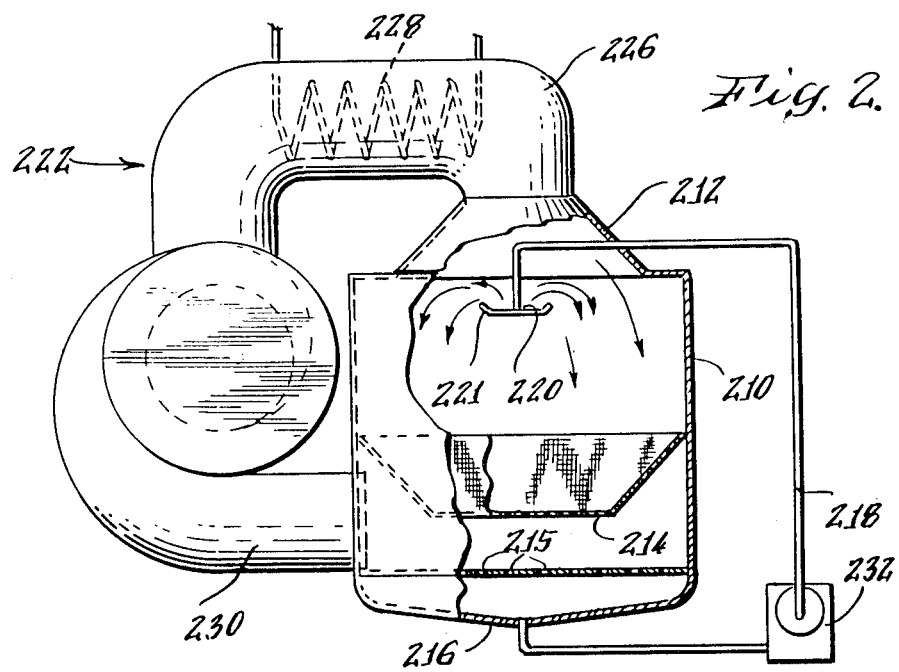
FIG. 2 schematically illustrates, partly in section, a more preferred embodiment of the invention wherein the heating chamber is closed and the air and oil are recycled.

FIG. 2 schematically represents a simplified apparatus which remedies the two principal difficulties with the apparatus shown in FIG. 1. Thus, the apparatus shown in partial section in FIG. 2 provides means for recirculating both the oil and the air. The parts in FIG. 2 will be numbered with 3-digit numbers greater than 200. Those parts which are the functional equivalents to similar parts in FIG. 1 will have the same last two digits as the like part in FIG. 1. For example, heating chamber 210 is essentially equivalent to the pan 10 in FIG. 1 in that it holds the foraminous support means 214 which holds the food or other articles to be cooked.

At the top of heating chamber 210 is a conically-shaped upper chamber portion 212 where heated process air enters the chamber 210. At the bottom of chamber 210 is a reservoir 216 for holding a supply of liquid heat exchange medium for the process. Prior to starting the apparatus into operation, the reservoir 216 is supplied with an appropriately small amount of liquid medium which is circulated through line 218 to the liquid dispersion means 220 by means of a pump or other circulating device 232. The dispersion means 220 can have a plurality of radially-extending conduits 221 each terminating with one or more orifices to disperse the oil. If desired, the conduits 221 can have further orifices along their radial extents to provide additional outlets for the liquid medium.

Hot air generator, shown generally as 222, will draw air from the heating chamber 210 by means of conduit 230 and direct the air through conduit 226 which has an electrical resistance heating element 228 positioned therein. Means 228 will heat the air as it is passed through conduit 226 prior to directing it past the oil dfispersion means 220 which continuously introduces finely dispersed liquid heat exchange medium into the air. The air is then drawn through the support 214 containing articles to be heated and recirculated through line 230 to the process. Because the cover 212 permits sealing the heating chamber, heating can be conducted under a positive pressure to achieve more rapid cooking.

A portion of the liquid heat exchange medium will contact the articles maintained within support 214 and provide heat transfer thereto. A portion of the liquid medium, however, will remain in the air stream as it is being recirculated through the hot air generator 222 by means of conduit 230 for recontact with the article to be heated on the next path through the heating chamber 210. if desired, a filter element, not shown, can be employed within conduit 230 to condense the oil, prior to reheating, either for discarding upon termination of the process or for return to the reservoir 216 for recycling to the process.

The amount of oil employed will preferably be sufficient to permit complete wetting of the food or other articles held within the support 214 and result in dripping from the articles through screen 215 for collection in reservoir 216. Screen 215 prevents any solid particulate materials over a predetermined size from entering the reservoir and the oil recirculation means.

Figure 3:
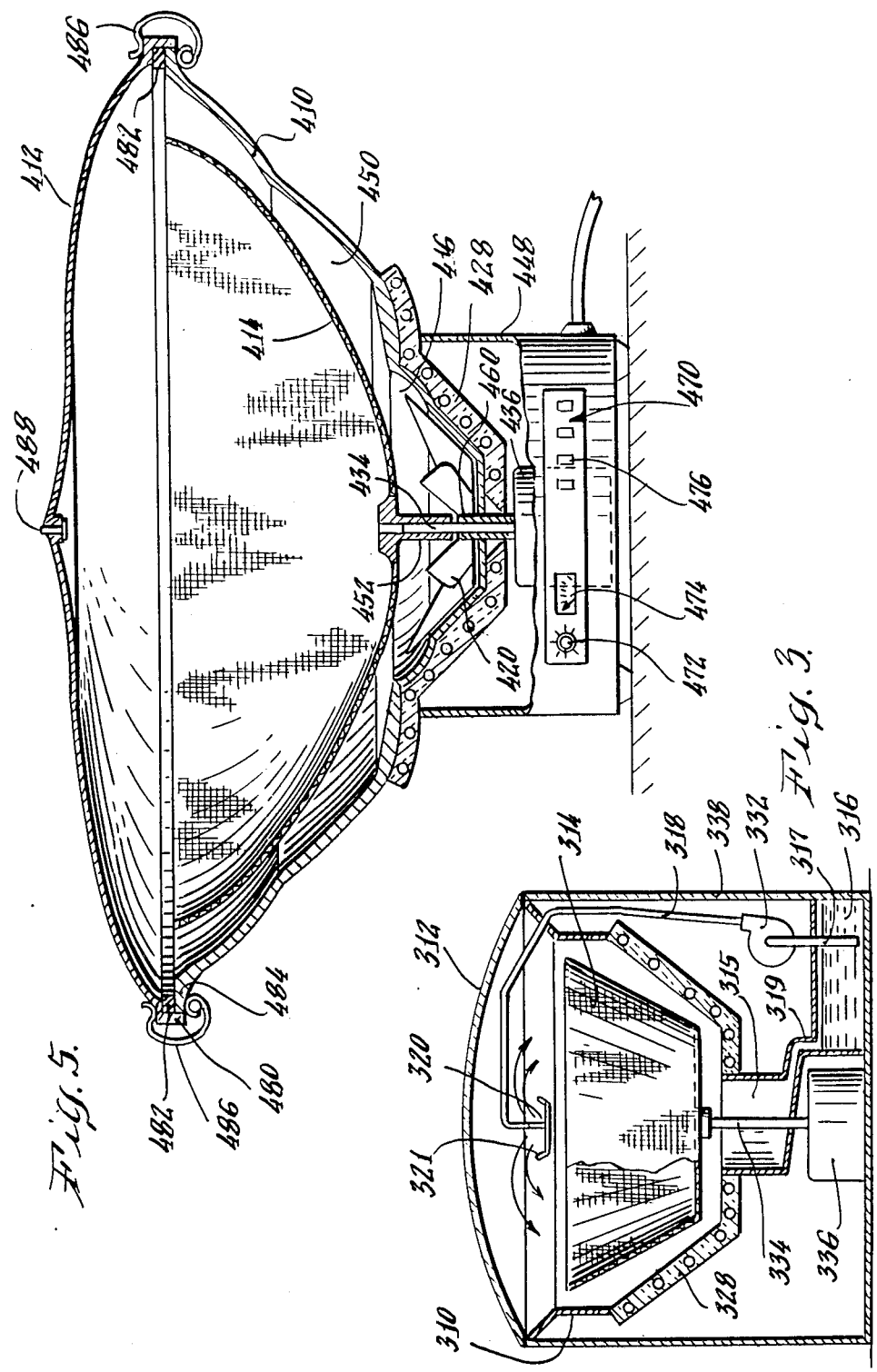
FIG. 3 schematically illustrates, also partly in section, an embodiment of the invention wherein the chamber is closed and the convective flow of air is created by rotating the support within the chamber which holds the food.

A more preferred embodiment of the invention is shown in FIG. 3 wherein parts which are fully equivalent to those in either of FIGS. 1 or 2 have the same last two digits as those parts, but all parts are labeled with numbers above 300. This embodiment differs principally from those of FIGS. 1 and 2 in that convection within the oven is created by rotating the foraminous support 314 within the chamber 310 instead of holding the support stationary as in FIGS. 1 and 2 and forcibly directing air therethrough.

As with the embodiment of FIG. 2, the chamber 310 is closed, in this embodiment having a cover 312 which enables sealing and pressurizing the chamber. Oil or other liquid heat exchange medium is maintained in reservoir 316 and is pumped through conduit 318 by means of draw pipe 317 and pump 332 to oil dispersion means 320 having a plurality of radially extending dispersion conduits 321 therein. The lower portion of the chamber 310 is seen to include electrical resistance heating elements 328 embedded within a ceramic or other material which maintains good heat exchange contact with the interior of the chamber and, preferably, the collecter 315 and reservoir 316. Optionally, a separate heating means (not shown) can be employed in reservoir 316.

The foraminous support means 314 is rotatably mounted on a shaft 334 which is turned at a desired rate of speed by an electric motor shown schematically as 336. The entire lower portion of the apparatus is maintained within a housing 338 which can contain suitable control means, not shown, on the exterior thereof.

In the operation of the apparatus shown in FIG. 3, oil is continuously dispersed from means 321 into the air maintained within the chamber 310. The liquid heat exchange medium contacts by air flow onto the contents of the support 314 which are maintained in constant rotation by motor 336. The motor can be driven at speeds effective to maintain a rapid relative motion between the air within the chamber and the contents of the support 314 to provide the convection heating effect. If desired, the motor 336 can be controlled by means not shown to vary the rate and direction of rotation of the support 314.

As with the other embodiments, the oil will be supplied at a rate sufficient to fully wet the surfaces of the contents of support 314 such that the liquid medium can most effectively be employed to improve the heat transfer from the heating means 328 to the food. A portion of the liquid medium will drip from the contents of the support 314 directly onto the heated lower portion of chamber 310, be collected in means 315 and then passed into reservoir 316 by line 319 for recycle to the process or storage until the next cooking operation. Preferably, the rate of rotation of support 314 is periodically increased to a rate effective to cause excess liquid medium to be removed by centrifugal force onto the interior of the heating chamber 310 for flow downwardly into reservoir 316, being heated along the way by heating elements 328. And, after heating is completed, the rate of rotation of support 314 is again increased, and the pump 332 is stopped, to spin off excess liquid which is then collected in reservoir 316 for storage until the next cooking cycle.

Figure 4:
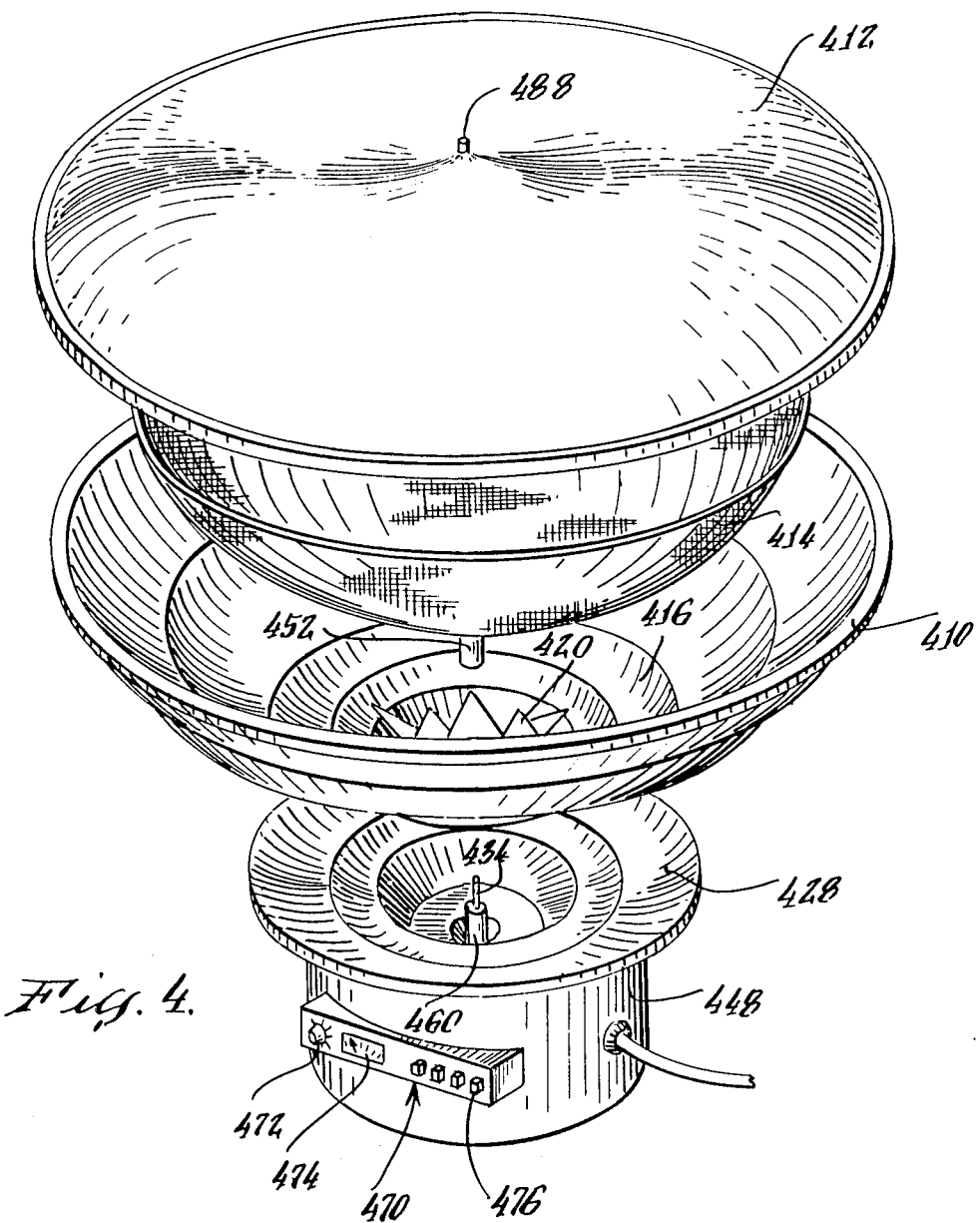
FIG. 4 is an exploded view in perspective which illustrates a preferred apparatus according to the invention.

The device shown in FIGS. 4 and 5 is a more preferred arrangement according to the present invention. All of the parts in FIGS. 4 and 5 are identified with three-digit numbers greater than 40%, with all parts which are equivalent to those shown in previous Figures having the same last two digits as their respective counterparts.

Referring first to FIG. 5 which shows the apparatus in partial cross section, there is seen a heating chamber 410 having a cover 412 positioned thereon. Within the chamber is a foraminous support 414 having a generally circular cross section which decreases from top to bottom, giving a generally rounded shape. The support 414 is rotatably positioned within the chamber 410 to provide an annular space 450 between the support 414 and the interior of the chamber wall 410. At the bottom of the heating chamber is a reservoir 416 having a heat exchange element 428 in heat exchange contact therewith. Positioned within the reservoir 416 is an oil dispersion means 420 which in this embodiment is an impeller blade which continuously disperses the liquid heating medium which collects in reservoir 416 and throws the dispersion up through the bottom of the foraminous support 414 and through the annular passage 450 between the support 414 and the wall of chamber 410. The impeller 420 and the heat exchange element 428 operate much like a scraped surface heat exchanger to rapidly reheat the oil for recyclation.

As shown in the Figures, both the impeller means 420 and the foraminous support 414 rotate during the heating operation. Because the foraminous support 414 is of greater diameter than the impelelr 420, and because the impeller must operate at a high speed in order to finely disperse the oil, it is preferred that separate rotational drive shafts be provided to move these individual elements. Accordingly, a centrally-located shaft 434 is shown fitting into sleeve 452 at the bottom of the foraminous support 414. The shaft 434 is preferably mechanically interlocked by a suitable configuration, not shown, to prevent slippage between sleeve 452 and shaft 434. Positioned exteriorly of a lower portion of shaft 434 is a rotatable sleeve 460 onto which the impeller 420 is attached to permit rotation, but also preferably permit easy removal for cleaning. The sleeve 460 and the shaft 434 are made of suitable high-surface-strength materials which permit relative rotations at different speeds over extended periods of time without excessive wear.

The drawing in FIG. 5 shows a single electric motor means 436 which can be employed by suitable gearing to drive both shafts 434 and 460 at different rates of speed. However, it is desired to employ two separately controlable electric motors. Alternatively, a single, high-speed motor may be directly coupled to shaft 460 for constant speed of rotation of the impeller 420, with the rate of rotation of the shaft 434 being varied by means of a magnetic clutch or other suitable device.

Preferably, the rate of rotation of shaft 434 can be varied during operation to permit continuous rotation of the foraminous support 414 with periodical increases in the rate of rotation to a rate effective to cause excess liquid heat exchange medium to be removed from the articles contained in the support 414 by centrifugal force. Especially preferred are those arrangements in which the impeller blade 420 can be stopped at the end of a desired period of heating to terminate the dispersion of oil within the chamber and onto the food, but which permit rotation of the foraminous support 414 at a rate effective to centrifugally remove a significant portion of the excess cooking medium from the articles contained within the support 414.

As shown in FIGS. 4 and 5, a lower housing 448 has a control panel 470 on the exterior thereof. On the control panel is a control knob 472 which has the dual function of a main power switch and rheostat for controlling the power supply to heating element 428. Preferably, the control panel will also contain a temperature gauge 474 for more positive control of temperature within the chamber 410. One or more thermal couples, not shown, can be positioned at strategic locations within the chamber 410 to indicate or control the temperature at these locations. The control panel 470 will also contain speed control buttons 476 which can be employed to set the desired speed of rotation for both the impeller blade 420 and the support 414 as may be desired.

The cover 412 preferably has a downwardly depending outer flange 480 and a rubber or other suitable gasket material 482 positioned on the inside of the flange for contact with an upper flange 484 on the top of the chamber wall 410. Suitable clamping means are preferably provided as shown at 486 in the drawing for locking the cover 412 on top of the chamber 410 to provide the ability to maintain a positive pressure within the heating chamber. Preferably, the seal will be effective to maintain a pressure of from about 1 to about 50 psig during heating, and a pressure relief valve 488 will be provided at the top of the cover 412 to permit release of gases in the event of excessive pressure buildup. The pressure relief valve 488 can also be employed to rapidly release the pressure upon termination of heating so that the clamping means 486 can be removed more quickly. The vent 488 at the top of cover 412 can be fitted with an oil trap and can be made adjustable if desired.

The drawing in FIG. 5 shows the relative placement of the parts of the apparatus in an exploded view, emphasizing the simplified cleanup which can be expected by the home cook when employing the apparatus. In essence, three main parts, the lower chamber portion 410, the foraminous support 414 and the cover portion 412 are removed from the base 448 for complete immersion in soapy water to effect rapid cleanup. The base remains clean and free of cooking mess.

The temperature indicator 474 on the control panel 470 can be employed to register the temprature internally of a food article which is cooked via holding the support member 414 stationary. Convection within the heating chamber 410 can be effected without rotation of the support 414 by properly designing the impeller to draw air up or down essentially through the foraminous support and then direct it outwardly through the annular channel 450 while dispersing the heated oil. The air flow through channel 450 would then impinge off the cover 412 and be again drawn through the contents of the support 414 and the support itself for redistribution through channel 450.

According to one exemplary mode of operating in apparatus as shown in FIGS. 4 and 5, the cover 412 and the foraminous support 414 are removed and the reservoir 416 is filled with an appropriate amount of oil, typically one half cup or less. Then, control 472 is set to achieve an appropriate temperature of about 400° F. for frying. Next, the basket 414 is replaced and filled with food such as chicken having a batter coating thereon. The lid 412 is then replaced and sealed by means of clamps 486. When the oil has reached the appropriate temperature, the rotation of the outer shaft 460 with the associated impeller blade 420 is begun to disperse hot oil throughout the chamber 410. Next, rotation of the inner-shaft 434 and the basket 414 are begun to provide appropriate convective hot air flow containing finely dispersed hot oil, relative to the chicken maintained within the basket 414.

After a desired period of time, typically about 2 minutes, the speed of rotation of the basket is increased to a rate effective to remove excess oil from the chicken by centrifugal force. Rapid rotation is terminated after about 15 seconds and cooking is continued for an additional 2 to 10 cycles of rotation at different speeds until cooking is completed. After cooking is completed, the rotation of shft 460 and the impeller blade 420 is terminated and the shaft 434 is again rotated at high speed for an additional few seconds to spin excess oil from the chicken to make it ready for consumption. Finally, the clamps 486 are loosened and the cover 412 is removed.

Another advantage of the apparatus of the invention is that the food can be maintained within the basket 414 with the cover on for continued warming for any desired period of time prior to serving, unlike conventional frying which requires removing the fried foods from the cooking container which typically contains large amounts of fat at the bottom. If needed, a brief period of cooking can be used to reheat foods that have become too cool for proper serving. Thus, according to the present invention, not only is the fear of frying overcome to a large extent, but the home cook's requirement for timing each of the individual items on the menu is made less critical.

BEST MODE FOR CARRYING OUT THE INVENTION

Figure 6:
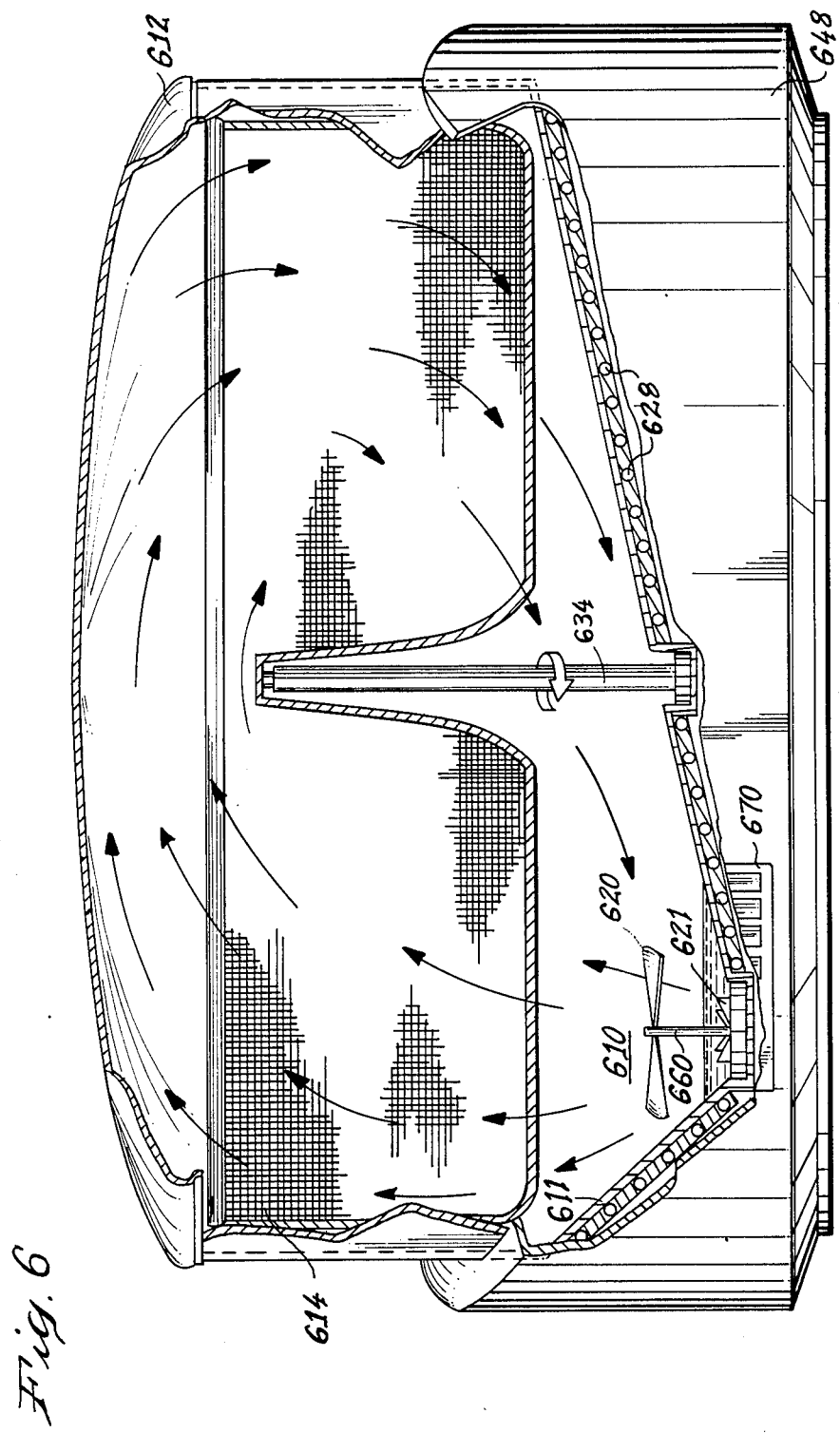
FIG. 6 is a front-elevation, partially in section, showing a preferred form of the apparatus which provides flow of heat exchange fluid from an impeller, accentrically positioned relative to the food support means.

The embodiment of FIG. 6 is the most preferred. According to this embodiment, a flow of heat exchange fluid (shown by arrows) is established which, due to its generation by impeller means 620 within the closed chamber 610 at a location accentrically positioned relative to the axis of rotation of the support 614, uniformly contacts the material being heated as it is being rotated by the support means. The axis of the support 614 and the impeller means 620 are spaced from each other effectively to create a flow of heat exchange fluid which passes up through the support at one side of its center and down through it at an opposed side. This flow, created by the impeller means, is in a plane which intersects the plane of movement of the support. The flow of heat exchange fluid substantially totally intersects the plane of the material to be heated.

By providing this type of flow, hot spots and dead spaces are greatly reduced—giving a product which is uniformly heated. Fried foods, which are among the most sensitive to uniform heating, will show a uniformly developed fried crust. Use of the apparatus for other cooking processes will show improvements also, though they may be less noticeable to casual observtion.

The heating chamber 610 is shown in FIG. 6 as the enclosed space between chamber liner 611 and cover 612. The chamber liner 611 is preferably removable in one piece from base 648. The liner preferably has a non-stick coating (not shown). The support or basket 614 is rotatable about an axis defined as shaft 634 which is driven by an electric motor (not shown). The motor is operated in known manner, preferably by suitable controls (note control panel 670) giving a wide variation in speeds ranging from zero to 100 or more rpm. In some cases, speeds of from about ½ to about 10 rpm will be preferred for many cooking operations to provide a desirable variation in the location of individual items to be heated relative to the flow of heat exchange fluid while not causing movement of the items within the support 614.

Accentrically located from shaft 634 is an axis defined by shaft 660 which rotatably supports impeller means 620. Also located on shaft 660 is a dispersing blade 621 or other device including ultrasonics, which functions to break up liquids into a fine dispersion for circulation through the chamber by a flow of air created by impeller means 620. A second electric motor (not shown) is configured in conventional manner to rotate shaft 660 and impeller means 620 at a wide range of speeds to establish and maintain a desired flow of heat exchange fluid within the chamber 610. Low speeds up to about 10–25 rpm will be effective for some cooking methods such as slow cooking wherein an aqueous sauce or gravy fills chamber 610 sufficiently to cover solid food maintained in the support 614. In other cases, particularly dynamic frying, wherein a cooking fat or oil is dispersed in a flow of air, higher impeller speeds sufficient to develop air flow rates conventional for convection heating will be desired. Very high speeds, effective to stir and toss foods such as cut vegetables and meat will also be desirable for cooking processes such as stir frying. For stir frying, it will be desirable to properly configure the support 614 and the cover 612 or a separate basket cover (not shown) to retain the rapidly moving food pieces within the support 614. Also, intermediate speeds may be effective for steaming, drying and other processes.

The liner 611 of chamber 610 is configured to slope toward impeller means 620 so that liquid heat exchange fluid contacting the wall will be collected there for recirculation. Also, preferably located in the lower portion of liner 611 are a plurality of electric heating means 628 for heating the heat exchange fluid to the desired temperature for transfer to the material being heated.

As will be apparent from the above description, the apparatus can be employed for heating foods other than with cooking oil and other than to provide a fried texture. For example, by employing water and suitably low temperature within the cooking chamber, the apparatus can provide the same heating advantages as boiling, but without great losses of valuable nutrients or flavors to the cooking water. Similarly, a basting sauce such as barbecue sauce can be employed. The basting sauce can be used in small amounts and finely dispersed in a circulating flow, or can be present in large quantities and slowly circulated in bulk to slow cook the food. Also the apparatus can be used to stir fry foods using small amounts of very hot oil. And, if desired, the apparatus can be employed to steam foods in both a conventional fashion and an enhanced convection steaming mode, thus making the apparatus more versatile and useful to the home cook. Also, by employing no liquid medium but circulating only hot air and exhausting a portion of it, foods can be efficiently convection heated or air dried. by enabling the use of the apparatus for a wide variety of common cooking procedures, and thereby increasing its utility, the home cook's familiarity with the apparatus and its advantages will become more pronounced due to more frequent use. And, special foraminous supports of particular shapes for particular food products can be designed to take advantage of this versatility.

The above description has been for the purpose of teaching the person of ordinary skill in the art how to use the present invention. Applicant did not intend to describe each and every obvious modification of the invention which will become apparent to skilled workers upon reading the description. It is intended, however, that all such obvious modifications and variations be included within the scope of the invention which is defined by the following claims.

I claim:

1. A process for heating food which comprises: placing food on a foraminous support within a heating chamber; creating a flow of air about a heat source to increase the temperature thereof to a predetermined temperature sufficient to rapidly heat said food when admixed with a liquid heat exchange medium; circulating said air flow about the food within said chamber while introducing said heat exchange medium into said air flow in a quantity sufficient to thoroughly wet the surface of the food and to drip into a reservoir from which it can be recycled for redispersion into said air flow; collecting and reheating liquid heat exchange medium having dripped from said food; redispersing said liquid heat exchange medium into said air flow; and continuously circulating the air containing a dispersed heat exchange medium between the food and said heat source for a period of time sufficient to heat said food.

2. A process for heating food which comprises: placing food on a foraminous support within a closed heating chamber; creating a flow of air about a heat source to increase the temperature of the air to a predetermined temperature within the range of from about 250° to about 450° F.; circulating said air flow about the food within said chamber while introducing a liquid heat exchange medium into said air flow in a quantity sufficient to thoroughly wet the surface of the food and to drip into a reservoir from which it can be recycled for redispersion into said air flow; collecting and reheating liquid heat exchange medium in a reservoir at the bottom of said chamber; redispersing said liquid heat exchange medium into said air flow by impeller means located within said reservoir; and continuously circulating the air containing dispersed heat exchange medium between the food and said heat source for a period of time sufficient to heat said food.

3. A process according to claim 2 wherein the foraminous support is rotated within the chamber during heating.

4. A process according to claim 2 wherein the foraminous support is rotated and the speed of rotation is increased at least once during heating to remove excess liquid heat exchange material therefrom by centrifugal force.

5. A process according to claim 2 wherein the liquid heat exchange medium comprises a triglyceride fat.

6. A process according to claim 2 wherein the chamber is closed and the air is continuously circulated within the chamber.

* * * * *